(12) United States Patent
Mello et al.

(10) Patent No.: US 7,766,223 B1
(45) Date of Patent: Aug. 3, 2010

(54) METHOD AND SYSTEM FOR MOBILE SERVICES

(76) Inventors: Steven M. Mello, 43 Briar Rd., Bedford, NH (US) 03110; Arlen J. Van Draanen, 13260 SE. 18th St., Bellevue, WA (US) 98005; John A. Dion, 23 Bolic St., Nashua, NH (US) 03062

( * ) Notice: Subject to any disclaimer, the term of this patent is extended or adjusted under 35 U.S.C. 154(b) by 18 days.

(21) Appl. No.: 12/263,865

(22) Filed: Nov. 3, 2008

Related U.S. Application Data (60) Provisional application No. 60/986,559, filed on Nov. 8, 2007.

(51) Int. Cl.
*G06K 5/00* (2006.01)
*G07F 19/00* (2006.01)

(52) U.S. Cl. .................... 235/379; 235/380
(58) Field of Classification Search ............... 235/379, 235/380, 382, 383, 492, 493; 713/166, 182; 705/67, 44
See application file for complete search history.

(56) References Cited

U.S. PATENT DOCUMENTS

| | | | |
|---|---|---|---|
| 6,741,851 B1 * | 5/2004 | Lee et al. ............... 455/410 |
| 7,168,091 B2 | 1/2007 | Schutzer | |
| 7,245,902 B2 | 7/2007 | Hawkes | |
| 7,249,092 B2 | 7/2007 | Dunn et al. | |
| 7,323,967 B2 * | 1/2008 | Booth et al. ............ 340/5.73 |
| 7,380,121 B2 * | 5/2008 | Nomura et al. ............ 713/166 |
| 7,392,944 B2 * | 7/2008 | Shieh ............... 235/382.5 |
| 2002/0095389 A1 * | 7/2002 | Gaines ................ 705/67 |
| 2004/0039694 A1 | 2/2004 | Dunn et al. | |
| 2004/0049684 A1 * | 3/2004 | Nomura et al. ............ 713/182 |
| 2004/0104265 A1 * | 6/2004 | Okada et al. ............ 235/380 |
| 2005/0038744 A1 | 2/2005 | Viijoen | |
| 2007/0053518 A1 | 3/2007 | Tompkins et al. | |
| 2007/0100745 A1 | 5/2007 | Keiser et al. | |
| 2007/0155366 A1 | 7/2007 | Manohar et al. | |
| 2007/0203827 A1 | 8/2007 | Simpson et al. | |
| 2007/0203836 A1 | 8/2007 | Dodin | |

* cited by examiner

*Primary Examiner*—Thien M Le
(74) *Attorney, Agent, or Firm*—McLane, Graf, Raulerson & Middleton, Professional Association; Scott C. Rand (57) ABSTRACT

A method for providing mobile services, such as mobile financial services, includes providing a wireless handset or other device as an adjunct access device for a user account. The device is assigned a unique identification number, such as an MDN, MEID, or both. The unique identification number is associated with the account and in an exemplary embodiment, comprises at least a portion of the account number(s) with the service provider. Transactions are conducted with the handset access device and enhanced multi-factor and biometric security authentication may be provided. Handset voice, data, or other usage is settled and billed within the financial account. The service provider is able to download software, advertising, or content applications to the adjunct device and maintains the capability to disable the device. In a further aspect, a system for the execution of mobile transactions is provided.

20 Claims, 9 Drawing Sheets

METHOD AND SYSTEM FOR MOBILE SERVICES

CROSS REFERENCE TO RELATED APPLICATION

This application claims the benefit of priority under 35 U.S.C. §119(e) based on U.S. provisional application No. 60/986,559 filed Nov. 8, 2007. The aforementioned provisional application is incorporated herein by reference in its entirety.

BACKGROUND

The present disclosure relates generally to a method and system for facilitating wireless transactions using a wireless device and, more particularly, a method and system that integrates a wireless adjunct device into a high security environment for simultaneous management and manipulation of a single wireless device and one or more user accounts via a unique identification number of the wireless adjunct device, such as the MDN and/or MSISDN.

The system and method disclosed herein find particular application in conjunction with banking or other financial transactions conducted with a financial institution and will be described primarily with particular reference thereto. However, it is to be appreciated that the system and method herein are amenable to all manner of financial and non-financial transactions between a customer and a service provider using a wireless device, including, without limitation, transactions in the fields of banking, finance, health care, multimedia entertainment, and so forth.

Economic activity increases as advances in banking and payment systems are developed. Ubiquitous wireless devices (including telephones) demonstrate potential for a new paradigm in banking and payments. Both consumers and financial institutions desire secure, cost reducing, convenience enhancing wireless mobile banking and payment systems.

Currently, most mobile financial service processes involve complex executable software that must be designed for all equipment on all platforms. Other available transactions schemes pass sensitive data amongst multiple parties that may or may not exhibit due care. Convenience suffers with design requirements for multiple accounts across multiple platforms. Also, would-be service providers, and financial institutions, currently design systems and processes for multiple devices across multiple communications platforms.

Typically, to deliver mobile financial services, a financial institution, such as a national bank, develops proprietary software to conduct financial transactions on wireless mobile telephones. Since consumers own myriad handset models produced by many manufacturers and registered with multiple carriers potentially operating on multiple wireless or cellular technologies (e.g., GSM, CDMA, TDMA, WiMax, WiFi, etc.), banks must develop such software so that it conveniently downloads and operates within hundreds of different problem sets. Further, the bank must develop such software so that it executes properly in several development environments (e.g., Java, Brew, J2ME, OFX, and others) and across several different telephone carriers (e.g., AT&T, Sprint, and so forth). See Tompkins et al., U.S. Patent Publication No. US2007/0053518. This remains the case whether designing a financial product specifically involving, but not limited to, banking, payments, insurance, wagering, foreign remittance, brokerage, health care, health care savings, payroll or other type or style of account.

Another drawback in the current art beside the need to develop cross-carrier, cross-device, cross-platform transactional software is the need for carrier approval, both prior and ongoing, to place executable software on handsets that access their respective networks. Such permission is obtained, often at great cost, at the pleasure of the carrier.

Another drawback of known systems, beyond carrier assent and cross-development, is the need to conveniently distribute such software to account holders in versions appropriate for their particular handset, and to train consumers in how to download and operate the software.

Furthermore, transactional and data security pass through many hands in the current state of the art. Once operable on the handset, the software, in order to execute financial transactions, must often pass instructions through a software development firm's servers, through other service provider servers for management and storage and transmission, and others, in order for the national bank to settle financial transactions. See Viijoen, U.S. Patent Publication No. US2005/0038744.

Other attempted prior art wireless mobile financial transaction solutions involve the use of SMS messages. One advantage of using SMS for delivering financial transaction capability is that it successfully interacts with all wireless devices and requires no handset-based executable software or carrier assent to utilize. However, SMS messages cost money to send and receive, are susceptible to electronic "listening," suffer from latency time-out issues, lack confirmation of delivery to an intended recipient, as well as identity verification problems where the receiver or sender is never 100% sure of the other's identity. See Dodin, U.S. Patent Publication No. US2007/0203836. Another drawback to the use of SMS messages for mobile financial transaction is that SMS messages, containing potentially sensitive financial or account information, are stored in the mobile radio terminal's memory. See Hawkes, U.S. Pat. No. 7,245,902.

In another drawback to prior art systems, a bank or financial institution, which is customarily in complete security control of all of its processes and regulatory obligations, depends on multiple parties, that may or may not take due care, during the completion of a transaction. Consumers, deeming banks trustworthy, may have no understanding regarding the number of parties with access to their personal information, or who may be processing, handling, or storing their personal information.

Currently, it is inconvenient for consumers to understand their account balances in real time, and to know when overdrafts may occur, or when consumers may deem it advisable to overdraft their accounts. In the current state of the art, banks and other financial institutions produce in-house evaluations and risk assessments regarding consumer balances and overdraft scores. See Simpson et al., U.S. Patent Publication No. US2007/0203827; Keiser et al., U.S. Patent Publication No. US2007/0100745. Consumers may or may not know that they are overdrafting in a situation and may or may not understand the fees to be incurred for doing so.

Additionally in the current art, it is most difficult to manage multiple financial accounts, or more specifically, parent and subsidiary accounts between family members or those with other relationships. See Dunn et al., U.S. Pat. No. 7,249,092.

Also in the current state of the art, transaction and data security can be premised on biometric authentication solutions, and more specifically, voice biometric authentications. Such biometric authentication is desirable at specific transaction or security thresholds, such as dollar amount, access to space, or access to records, e.g., medical or financial records. However, voice biometric authentication solutions available require mapping of ultra large datasets. See Manohar et al., U.S. Patent Publication No. US2007/0155366. Such solutions require vast amounts of database storage, require more time to complete search and comparison functions, and are subject to false and fraudulent biometric authentications, specifically, false positive voice biometric authentications from fraudulent recordings. See Schutzer, U.S. Pat. No. 7,168,091.

Also in the current state of the art, consumer handsets used for wireless financial transactions or other transactions or for access to sensitive information such as health care information, are set up for the consumer's preferences and tastes. Consumers and account holders also, may not keep their wireless accounts open, rendering their access to any executable software or SMS styled transactions schemes for which they may have registered, dubious. Consumers may also abuse their financial accounts and/or their access to those accounts.

Accordingly, the present disclosure provides a new and improved method and system for facilitating wireless transactions using a wireless device that overcome the above-referenced problems and others.

SUMMARY

In one aspect, a method for facilitating wireless transaction bank, financial institution, or other service provider includes providing a wireless mobile device, such as a telephone, satellite telephone, personal digital assistant (PDA), portable computer, or the like, to an account holder and simultaneously issuing the account holder a unique identification number of the type enabling the wireless device access to a wireless network, such as a mobile directory number (MDN) and/or a mobile equipment identification number (MEID). The account holder may then use the device to conduct transactions. Multi-factor user authentication is used to verify the identity of the user as the account holder and, optionally, further enhanced biometric security may be provided. The account holder may also employ the wireless device for voice or data transmissions and communications, as the case may be. In certain embodiments, the financial institution or other service provider may input software applications to the device, download software applications to the device remotely via the wireless communication network, or disable the device remotely via the wireless communication network. In a further aspect, a system for providing mobile financial services is provided.

One advantage of the mobile transactions system and method in accordance with the present disclosure resides in the ability to reduce cost, reduce design requirements, increase security, and enhance convenience over existing mobile transaction systems.

Another advantage of the system and method in accordance with the present disclosure is that they are carrier independent.

Another advantage of the presently disclosed system and method resides in the fact that they limit the software platforms and hardware equipments necessary to design software for, or, in certain embodiments, eliminate the need for executable software entirely.

Still another advantage of the presently disclosed system and method is found in that at least some of the shortcomings associated with SMS financial transaction methods are alleviated by the present disclosure, since no sensitive data is left in the memory of wireless device and user identity may be confirmed through the use of a biometric authentication such as voice biometric authentication.

Yet another advantage of the presently disclosed system and method is that they allow for a more centralized, streamlined, and secure process for executing mobile financial services. It would therefore be desirable to provide enhanced multi factor authentication and still further enhanced biometric security to transactions where threshold values, data sensitivity, etc., may warrant it, without fear of recordings producing false positive authentications.

Still another advantage of the present disclosure is that it provides the ability for consumer participation in the overdraft process, wherein the adjunct wireless device can be used to offer the account holder, whether by voice or SMS, an option to authenticate and authorize or to deny an overdrafting circumstance in real time.

Another advantage of the present disclosure is found in that parent accounts may be associated with a primary adjunct access device and MDN and one or more subsidiary accounts associated with one or more additional adjunct access devices, thus enabling, in conjunction with internet online banking pre-set preferences, a method of issuing peer-to-peer payments amongst and between the parent account and the subsidiary account(s).

Yet another advantage of the present disclosure resides in its ability to utilize voice biometric data sets that are easily and swiftly analyzed to quickly authenticate, approve, and consummate financial transactions.

Still another advantage of the present disclosure is found in that financial institutions seeking to transact wirelessly with account holders in profitable manner are able to import or download software or applications or content or accessories to the wireless adjunct device to maximize it for use with the financial institutions programs and procedures or for the institution to disable the device in the case of misuse or in other circumstance.

Still further advantages and benefits of the present invention will become apparent to those of ordinary skill in the art upon reading and understanding the following detailed description of the preferred embodiments.

BRIEF DESCRIPTION OF THE DRAWINGS

The accompanying drawings, which are incorporated in and constitute a part of the specification, illustrate embodiments of the invention and together with the description of the invention herein, serve to explain the principles of the invention.

DETAILED DESCRIPTION OF THE PREFERRED EMBODIMENTS

While not to be construed as limiting the scope of the present invention unless specifically indicated, for purposes of this specification, the terms used herein have the following definitions unless indicated otherwise.

"MDN" means Mobile Directory Number and represents the unique 10-digit telephone number assigned to a particular mobile handset account. MDN may also include other numbering systems or terminologies including specifically but not limited to Mobile Station Integrated Services Digital Network (MSISDN) number.

"MEID" means Mobile Equipment Identifier and means a globally unique number for a handset device and includes other terms specifically but not limited to ESN (electronic serial number), pESN (pseudo ESN) and tESN (true ESN) as well as IMEI, UIMID and others.

"SMS" means short message service, also known as text messaging. SMS includes other terms specifically but not limited to 'skymail' or 'short mail' and email variants such as Blackberry messages including multi-part SMS.

"MMS" means multi-media messages.

"IP" means internet protocol.

"WAP" means wireless application protocol.

"HTML" means Hyper-Text Mark-Up Language.

"WBMP" means wireless bitmap format.

Figure 1:
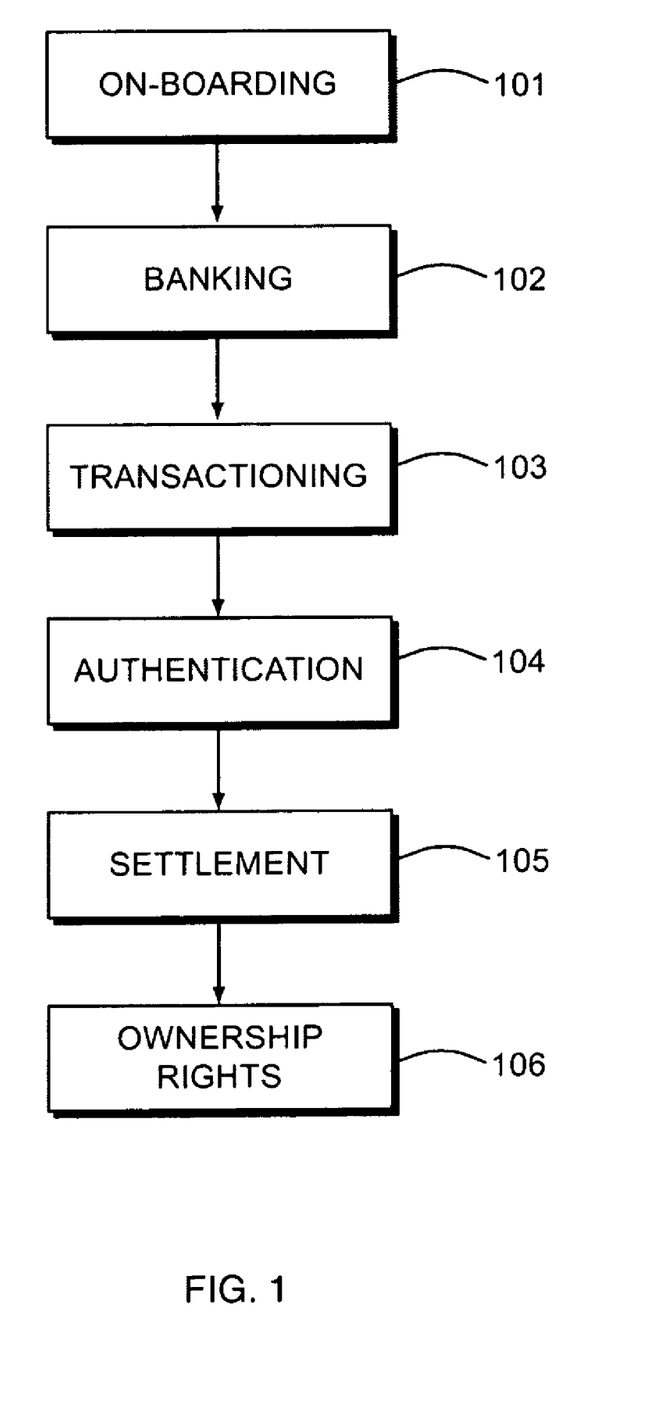
FIG. 1 presents a block diagram overview of the present disclosure and core elements of the system and methodology.

With reference now to FIG. 1, there is shown a block diagram depicting a system overview of the functional components or modules in accordance with a preferred embodiment of the present disclosure. The system includes an on-boarding module 101 for on-boarding a financial account at a financial institution 205 (see FIG. 2), which may include recording and storing a keyword or key phrase associated with the account holder for biometric identification verification purposes. An online banking module 102 is provided for opening an online banking account. A transactioning module 103 is provided for conducting transactions with the account, including mobile transactions performed with a wireless device 305 (see FIG. 3). An authentication module 104 is provided for authenticating transactions and a settlement module 105 is provided for settling the financial account transactions. An ownership rights module 106 is provided to allow the financial institution to download software, advertising, or other content to the wireless adjunct device 305 and/or disabling the wireless device 305, as the case may require.

Figure 2:
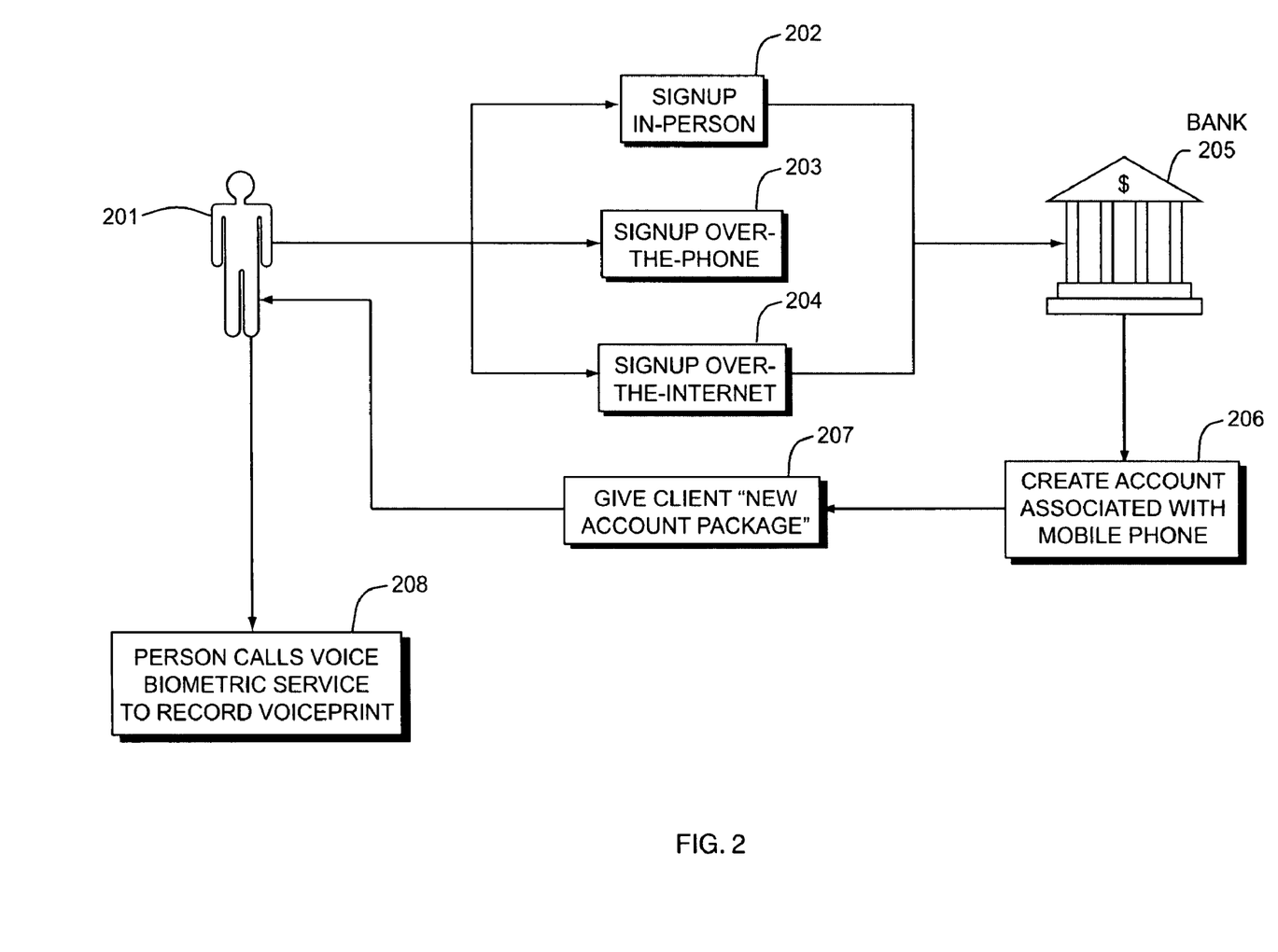
FIG. 2 presents a flowchart diagram illustrating the details of the on-boarding process of a new financial services account including issuing an adjunct wireless telephone device according to an exemplary embodiment of the present invention and including issuing an MDN or MSISDN and MEID to said device and obtaining a key phrase biometric voice print unique to the account holder.

Referring now to FIG. 2, an exemplary method of onboarding an account at the financial institution 205 is illustrated. An account holder 201 may register for a financial account with the bank or financial institution 205 via a number of methods. For example, the account holder 201 may visit the institution via a physical branch 202, may sign up over the phone via a call center 203, or may sign up online via an Internet interface 204.

At step 206, the bank 205 creates a user account and associates an adjunct wireless device 305 (see FIG. 3) with the account. The wireless adjunct device 305 may be, without limitation, a wireless mobile radio, cellular telephone, a personal digital assistant, a portable computer, or other hand held or portable computer based information handling system.

The bank 205 assigns to the account holder a unique identification number for the wireless access device 305, the unique identification number being of the type which enables the device 305 to access a wireless communications network for voice and data usage, access to the financial institution, and access to credit card, debit card, ATM, and other payment or transaction networks. The unique identification number may be, for example, the MDN, MSISDN, and/or MEID of the adjunct device.

Figure 5:
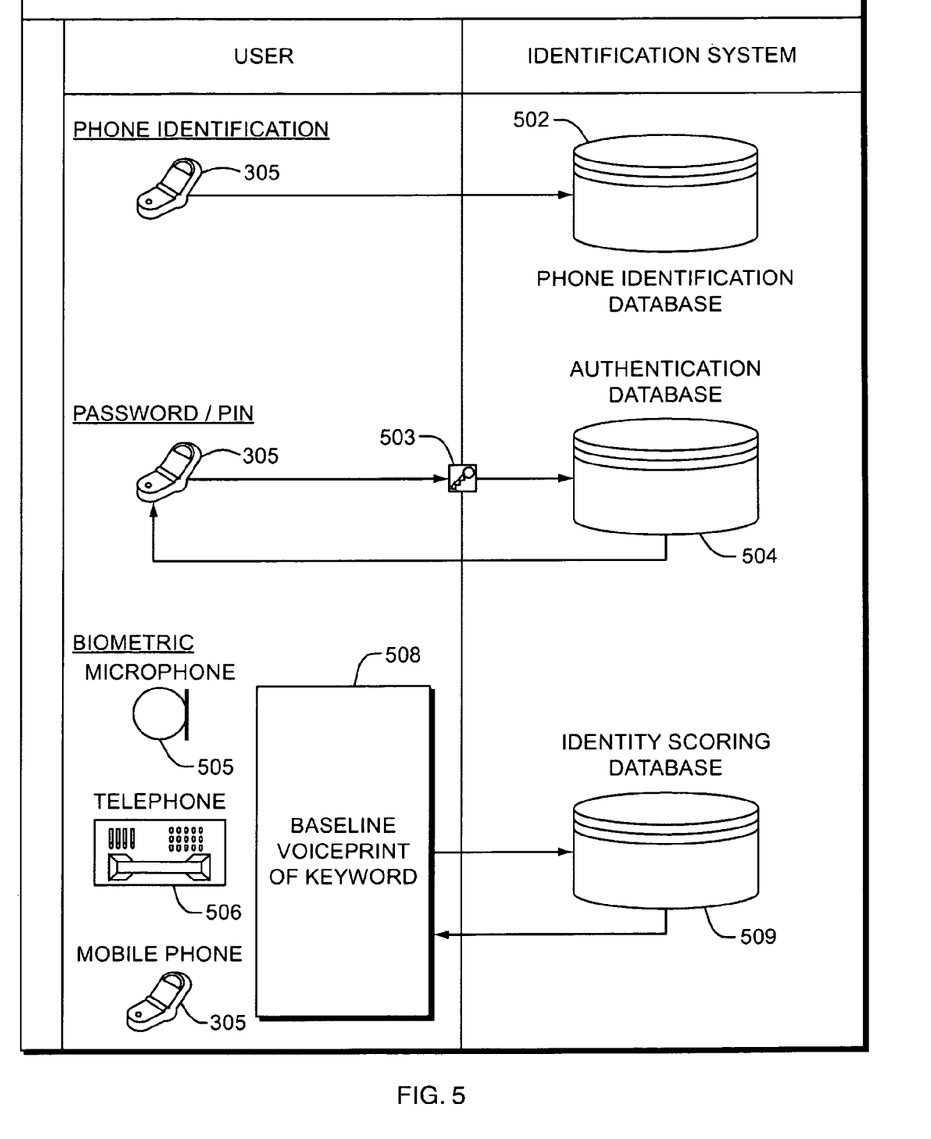
FIG. 5 presents a diagram indicating the details of an exemplary embodiment of the process where all three core authentication mechanisms, utilizing the MDN or MEID, a password and voice biometric are depicted.

The bank also assigns an account number to the new account opened at step 206 and creates an association between the account number and the unique identification number of the adjunct device 305, e.g., in a phone identification database 502 (see FIG. 5). In a preferred embodiment, the numbering system of the account is such that the account number corresponds to the unique identification number of the wireless adjunct device, and more preferably, to the MDN or MSISDN. If required, the account number may contain additional digits beyond those contained in the unique identification number.

At step 207, the wireless adjunct device is given to the account holder as an access device similar to an ATM card or checkbook. In a preferred embodiment, the adjunct device may be included as a part of an onboarding package, which may additionally include, for example, starter checks, an ATM card, debit/credit card, or credit card, and/or other equipment suitable for the type of financial institution and/or type of account opened.

At step 208, the client activates the wireless adjunct device, e.g., via activation instructions provided by the financial institution at the opening of a financial or other type of account. The user also records and transmits a biometric key phrase voice print to be stored for future transaction using the adjunct device simultaneous with the activation of the adjunct device 305. The device 305 will generally be equipped with a microphone for the input of an acoustic signal and which may be integral to the device 305 or separately attachable, e.g., as a part of a head set, or the like. As used herein, the term "microphone" refers to any acousto-electric transducer capable of converting acoustic signals into electrical signals. The account holder is also provided with an online internet banking interface in order to set up SMS, WAP or IP 'pre-sets' to enable financial transaction capability with the adjunct wireless communication device 305. Other types of biometric data, such as fingerprint data, retinal scan data, or facial recognition data, and so forth, are also contemplated.

In certain embodiments, multiple wireless adjunct devices 305 may be provided along with multiple associated MDN's or MSISDN's or the like to parent and subsidiary accounts in order to use each device to conduct transactions in the customary mode of the present disclosure, or, in conjunction with each other in peer-to-peer mode consistent with information pre-set on the associated online banking accounts.

Figure 3:
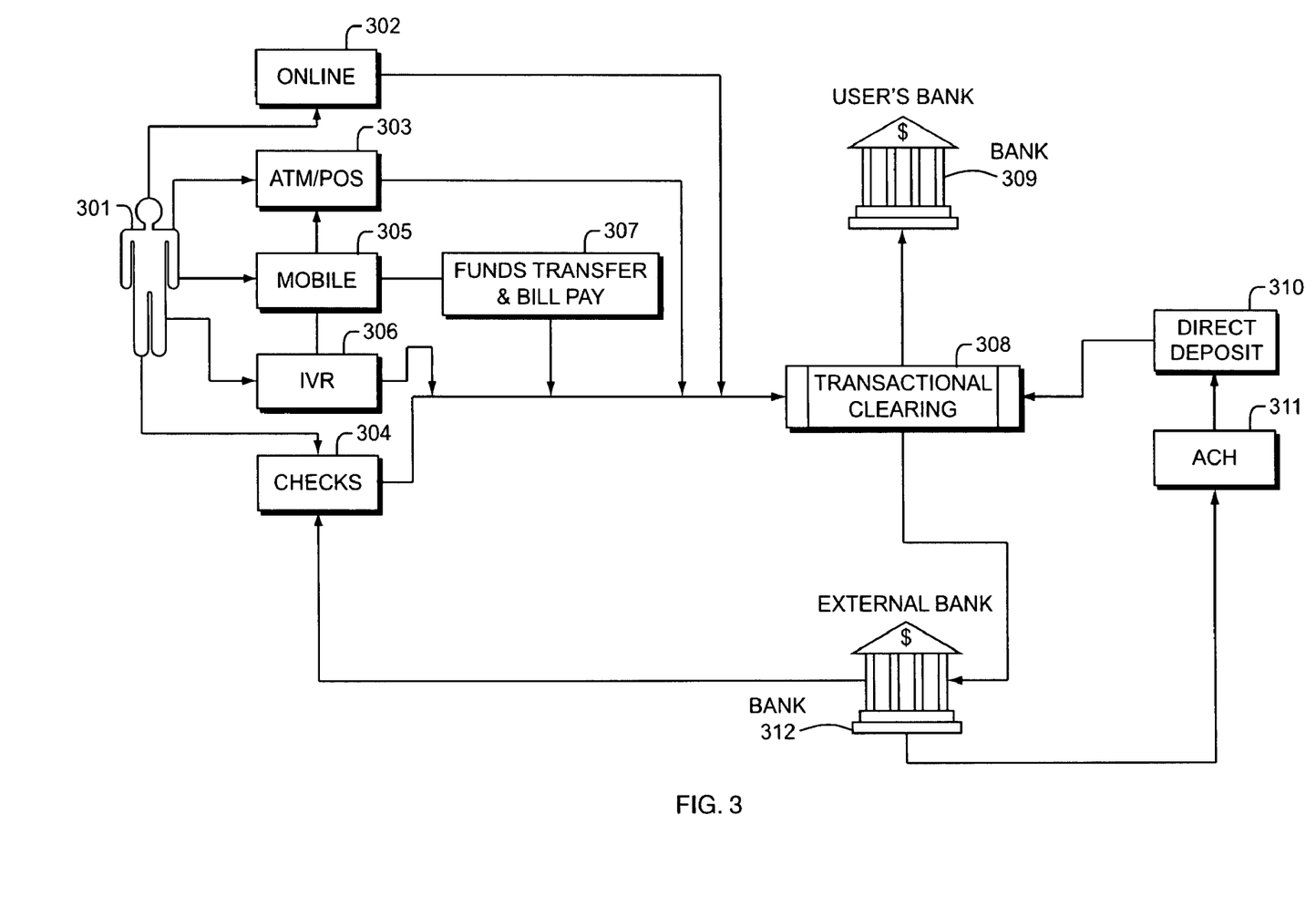
FIG. 3 presents a transaction wheel diagram illustrating the increased financial account functionality provided by the adjunct wireless radio telephone device and MDN numbering system and interactive voice response system according to the preferred embodiment of the present invention.

Referring now to FIG. 3, there is illustrated an exemplary banking method and system. After initial set up and authentication of the online banking account, as identified by its associated unique identification number such as MDN and MEID, to conduct transactions via SMS, WAP, IP, or other transmittal of banking or financial transactions, an account holder 301 may then execute standard financial transactions via a number of methods, such as using an online banking system 302, a contactless transaction terminal 303, e.g., via Bluetooth Technology, Radio Frequency Identification (RFID), or near-field communication technology (NFC), for access to the credit card, debit card, ATM, and point-of-sale (POS) networks. When the wireless adjunct device 305 is employed with contactless technology 303, it may preferably operate in one or more of simple contactless card emulation mode, interactive reader mode, or peer-to-peer (P2P) mode.

Transactions may also be conducted using standard paper checks 304 with an ABA number in addition to the MDN-associated account number, using the wireless adjunct device 305, via an interactive voice response (IVR) system 306 (or via a live call center), a funds transfer and online bill pay system 307, Automated Clearing House (ACH) payments 311, and direct deposit 310. All transactions are settled with the clearing system via the banks 'core' 308 and incoming deposits 309.

Figure 4A:
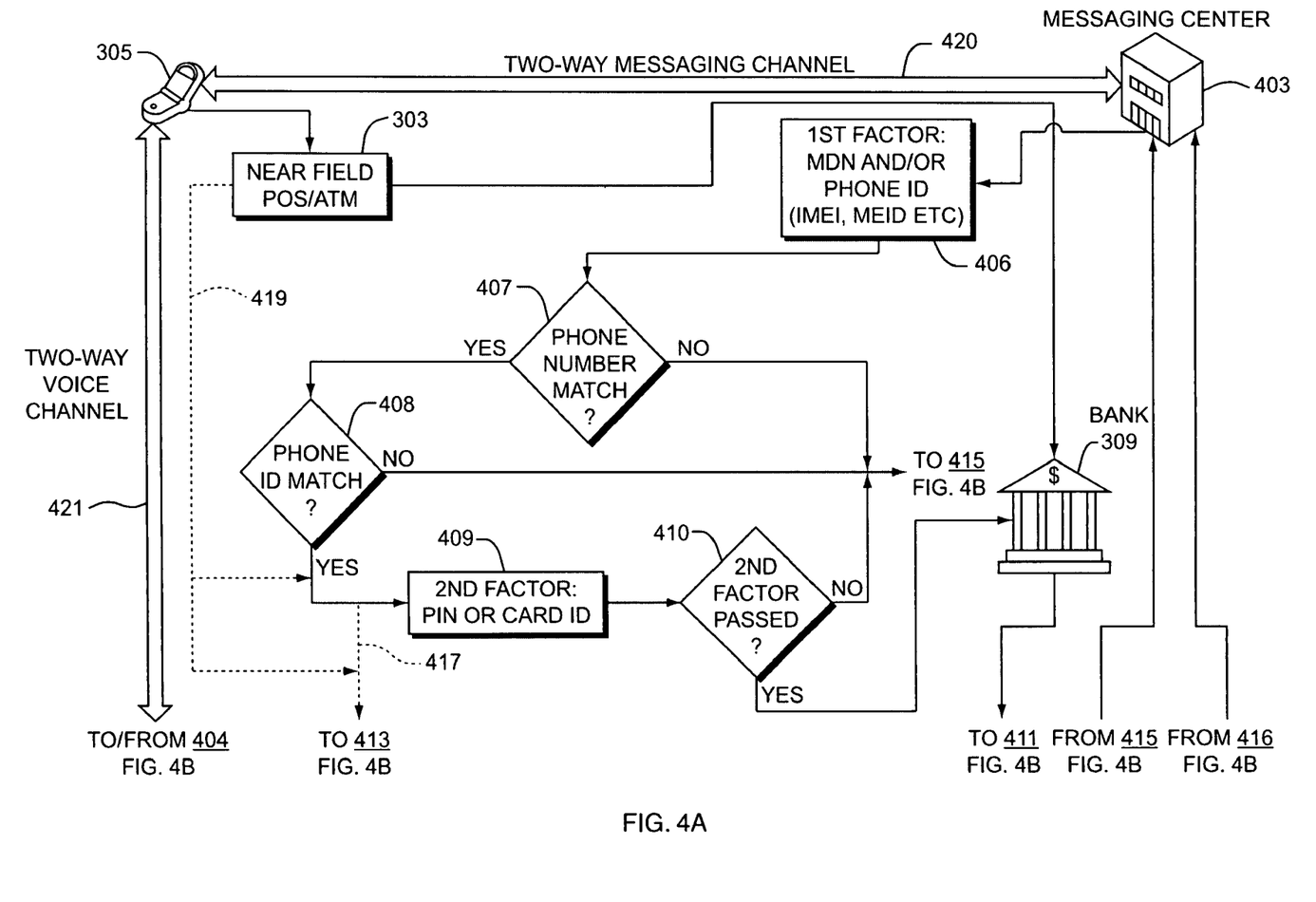
FIGS. 4A and 4B present a flowchart diagram depicting an exemplary embodiment of the present invention and layered multi-factor authentication system, where 'pin' based, or temporary 'pin' based multi-factor authentication is utilized for certain financial transactions requiring enhanced security.
Figure 4B:
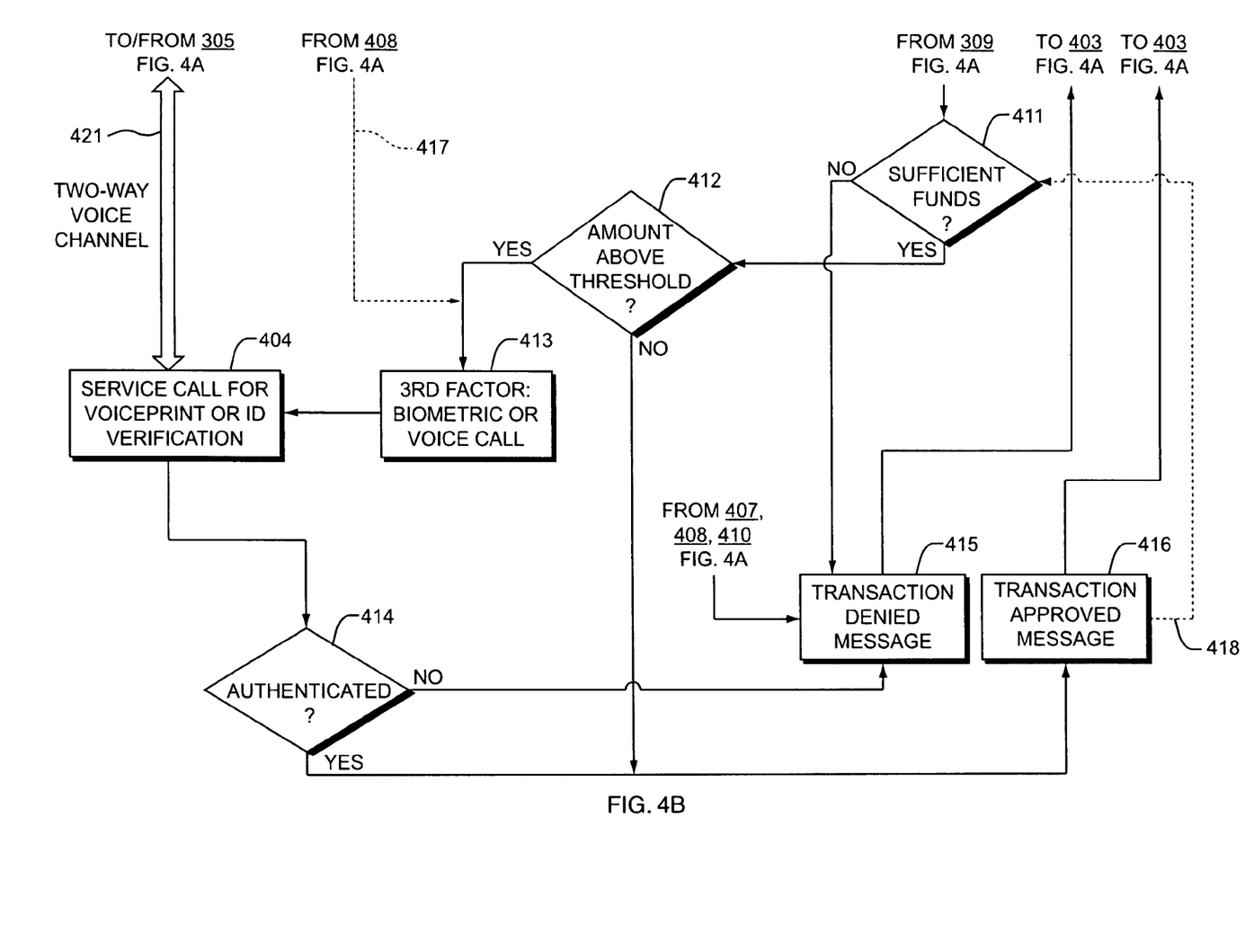

FIGS. 4A and 4B are a flow diagram illustrating an exemplary method of performing a mobile transaction using the wireless access device 305. Transactions preferences may be set on online banking to trigger necessary layered authentication mechanisms from single factor to multi factor. The wireless adjunct device 305 may be used at a near field point-of-sale terminal or ATM terminal 303 employing NFC technology, and the device itself constitutes a first factor of authentication, since the wireless adjunct device itself represents "something the account holder has." Thus, the process may bypass the first authentication factor 406 and may also, optionally, bypass the second authentication factor 409. These alternative pathways represented by the broken lines 419. Preferably, the desired level of authentication may be selectable as pre-stored transaction preferences, which may be input by the user and/or the bank or other system operator.

When the second authentication factor, which represents "something the account holder knows," such as a pin number or password, and which may be a temporary pin or password, is required, the process proceeds to step 409. At step 410, it is determined whether the second authentication factor passed, whether the correct PIN or password was input. If the second authentication factor fails as step 410, the process proceeds to step 416 and a message that the transaction has been denied is sent to the adjunct device via a message center 403. For most transactions, the second authentication factor 409 is a sufficient level of authentication. Biometric authentication can provide a third level of authentication, i.e., "something the account holder is," in several embodiments.

For near field point of sale or ATM transactions 303 using the mobile adjunct device 305, wherein the second authentication factor 409 is bypassed, the process proceeds from step 303 directly to the third authentication factor 413 and proceed as described below. Even where the authentication factors 406 and 409 are bypassed, an advanced two-factor authentication scheme for near field POS or ATM transactions 303 is provided, wherein the first factor is the adjunct device 305 itself, which is something the user has, and the second factor being the user's biometric characteristic, i.e., the voiceprint.

In addition to transactions 303 using near field communications, the mobile device 305 may also provide various transaction possibilities in the form of SMS messages or networking via messaging channel 420, and voice with DTMF (dual-tone multi-frequency) input via voice channel 421. Transaction instructions or data may be transmitted to a messaging center at step 403 via the channel 420. At step 406, the messaging center 403 authenticates the transaction using the first authentication factor by comparing against the message header MDN and MEID of the access device 305.

If the MDN is not associated with an account at the financial institution, the process proceeds to step 416 and a transaction denied message is transmitted to the user via the messaging center 403. If the MDN matches an MDN associated with an account at the bank 309 at step 407, the process proceeds to step 408 where it is determined whether the phone ID (MEID) matches the MEID associated with the account. If the MEID does not match the MEID associated with the account, the process proceeds to step 416 and a transaction denied message is transmitted to the user via the messaging center 403. If the MEID matches the MEID associated with the account, at step 408, the process proceeds to step 409. Alternatively, the second authentication factor 409 may be bypassed and the process may proceed directly to the third authentication factor 413, as represented by the broken lines 417.

Where the second authentication factor is required, a second authentication factor, such as a card ID or a PIN password, is input at step 409. If the transaction is executed at a fixed location such as an ATM or POS terminal, the second authentication factor may be input via the ATM or POS hardware. If the transaction is being performed from a remote location via messaging channel 420, the pin or password may be input using a keypad, touch screen, or the like of the wireless device 305. In this manner, multi-factor authentication of financial or other transactions can be executed without providing any sensitive or personal information resident the memory of the adjunct device 305.

If the second authentication factor fails at step 410, the process proceeds to step 416 and a transaction denied message is sent to the wireless device 305. If the second authentication factor passes at step 410, the bank 309 is triggered to determine whether sufficient funds are available in the account for the transaction sought to be executed at step 411. If sufficient funds are not available at step 411, the process continues to step 415 and a transaction denied message is sent to the wireless device 305 via the messaging center 403.

It is contemplated that the unique identification number, e.g., MDN, and wireless adjunct device to enable account holders to participate in the overdraft approval process via SMS or voice biometric authentication, in real time, to authorize and authenticate or to decline, as the case may be, pending overdraft transactions.

If sufficient funds are available to complete the requested transaction at step 411, the process proceeds to step 412 wherein it is determined whether the transaction amount exceeds some preselected or predetermined threshold value or other security threshold or criteria, such as a prespecified dollar value or sensitive nature of information or data being accessed. If the transaction amount/security threshold is not reached at step 412, the process proceeds directly to step 416 and a transaction approved message is sent to the account holder via the messaging center 403.

If the transaction amount is above the threshold amount or other financial or security threshold is reached at step 412, the process continues to step 413 and a secure third, biometric authentication factor, such as a voice biometric authentication or "voice print" is required to securely authenticate the transaction. In the depicted preferred embodiment herein, the voice biometric data unit comprises a two factor voiceprint and keyword combination. Alternatively, the process may proceed directly step 413 where one or both of the first and second authentication factors 406, 409, were bypasses, i.e., via pathways 417 or 419.

If the third, biometric authentication factor is required as step 413, the process continues to step 404 wherein a call is placed to the access device 305 and the user speaks the keyword or phrase. The input keyword or phrase is compared to the voice recording of the user stored in the database 509 (see FIG. 5). If the spoken keyword or phrase does not match the stored voiceprint of the account holder (e.g., comparing for both the correct words and the correct voice), the process continues to step 415 and a transaction denied message is sent to the wireless device 305 via the messaging center 403. If the spoken keyword or phrase matches the stored voiceprint of the account holder, the process proceeds to step 416 and a transaction approved message is sent to the wireless device 305 via the messaging center 403.

For transactions in which the standard second authentication factor 409 was bypassed as represented by the broken lines 417 or 419, and wherein the voiceprint was authenticated, the process proceeds to step 411, as represented by the broken line 418 to determine whether there are sufficient funds in the account to complete the transaction. If there are sufficient funds, the transaction approved message 416 is sent. If there are not sufficient funds, a transaction denied message 415 is sent.

FIG. 5 illustrates an exemplary method for authenticating a mobile transaction performed using the wireless access device in accordance with the present disclosure. The account holder uses the wireless adjunct device 305 to attempt a transaction, balance inquiry, funds transfer or other transaction. The financial institution identifies the adjunct device via an MDN or MEID based database 502. The account holder inputs a password or a pin 503 once connected utilizing a key system and achieves a second factor of authentication from a password/PIN authentication database 504. In the event a pre-set transaction amount threshold is reached, or, if the financial institution deems a third authentication factor necessary, a call is placed to the hand set 305 requesting the account holder input his key phrase 508 and the key phrase input is mapped to a database 509 for authentication. Alternative options for inputting the key phrase, such as a microphone 505, e.g., for recording the voice input at the institutions facility or land telephone 506.

Figure 6:
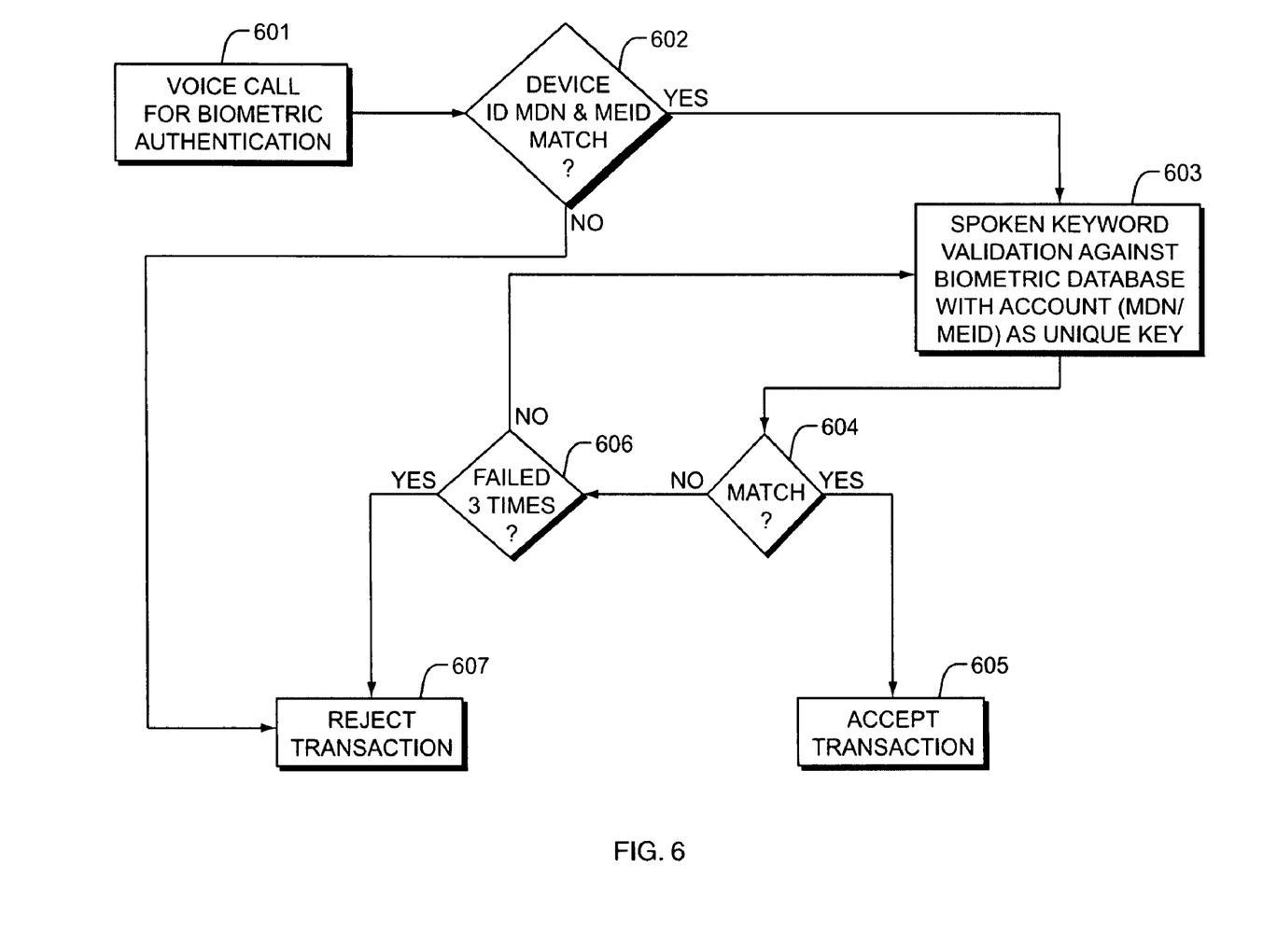
FIG. 6 presents a diagram that depicts an exemplary embodiment of the process wherein the authentication system has a one-to-one mapping at the biometric level.

FIG. 6 illustrates an exemplary biometric authentication method for authenticating a mobile transaction performed using the wireless access device in accordance with the present disclosure. At step 601, a call is placed from the adjunct wireless device and at step 602, it is determined whether the device is identified via the MDN, MEID, or both. If the call is not from an account-associated MDN, the process proceeds to step 607 and the authentication is rejected.

If it is determined at step 602 that the call is placed from an appropriate MDN or MEID, the process continues to step 603, and the user is prompted e.g., via an on-screen prompt appearing on a display of the adjunct device 305, to speak the key word or key phrase into a microphone of the adjunct device. The spoken keyword or phrase thus input to the adjunct device 305 with digital noise layered over the key phrase input recorded session. A digital representation of the spoken keyword or key phrase is transmitted to the biometric identity scoring site 509 (see FIG. 5) via the communications link 421 and at step 604 it is determined whether a match exists between the spoken keyword or phrase input in step 603 and the prerecorded voiceprint stored in the database 509. If there is a match at step 604, the process continues to step 605 and the transaction is authenticated, authorized, and accepted.

If there is not a match at step 604, continues to step 606 and it is determined whether the biometric authorization has failed some predetermined number of times, e.g., three in the illustrated embodiment. If the predetermined number of failed authorization attempts (e.g., 3 failed attempts) has not been reached at step 606, the process returns to step 603, the user is asked to again input the spoken keyword phrase and the process continues as described above. If, at step 606, it is determined that a positive biometric validation has not been obtained within the preselected number of attempts (e.g., 3), the process continues to step 607 and the transaction is rejected.

Figure 7:
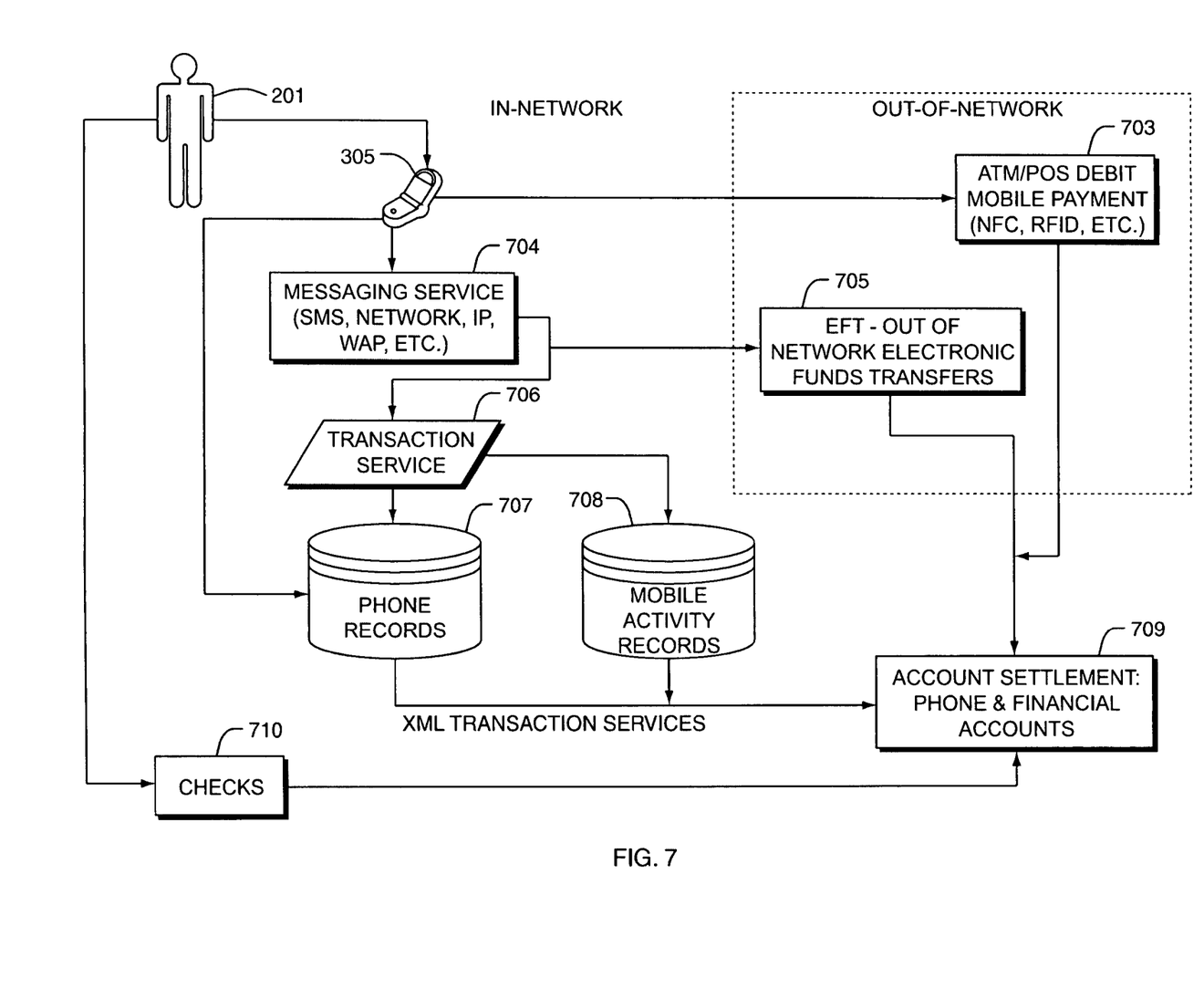
FIG. 7 is a flowchart diagram depicting the continuous settlement of a financial account or accounts and re-settlement of said account with voice and data usage input from the wireless device within and into the financial account within the bank's 'core' system.

FIG. 7 illustrates an exemplary method for settling a mobile transaction performed in accordance with the present invention. At step 704, the account holder 201 may conduct financial transactions with the adjunct device 305 in the financial institution's network via any of various communication protocols such as SMS, other network functions, internet protocol (IP), wireless application protocol (WAP), or via any contactless or contact mechanism that allows access to payments networks at step 706.

Alternatively, the adjunct device may be used for voice and data communication at step 707. Such transactions may include peer-to-peer transfers or transfers to other in-network account holders (step 706) or out of network accounts (step 705). The account holder 201 may also conduct out-of-network financial transactions via the conventional ATM or Point of Sale networks via debit cards (step 703), or via checks (step 710).

Settlement is conducted on the financial account, or the primary financial account where several subsidiary accounts are present, within the financial institution's core system, on a real time basis, for all financial transactions including those conducted utilizing the wireless adjunct device and further including settlement of the voice and data and other content or accessory aspects or charges associated with use of the adjunct wireless device via an appropriate application programming interface (API) into the single, or primary financial account within the financial institution's core system.

The underlying, carrier-based cellular tracking system sends the adjunct device voice and data usage 707 and mobile payment and account activity records 708 through to the financial institution via XML stream or other data feed 702 to the banks 'core' system 709, which are cleared using the bank's clearing system.

Figure 8:
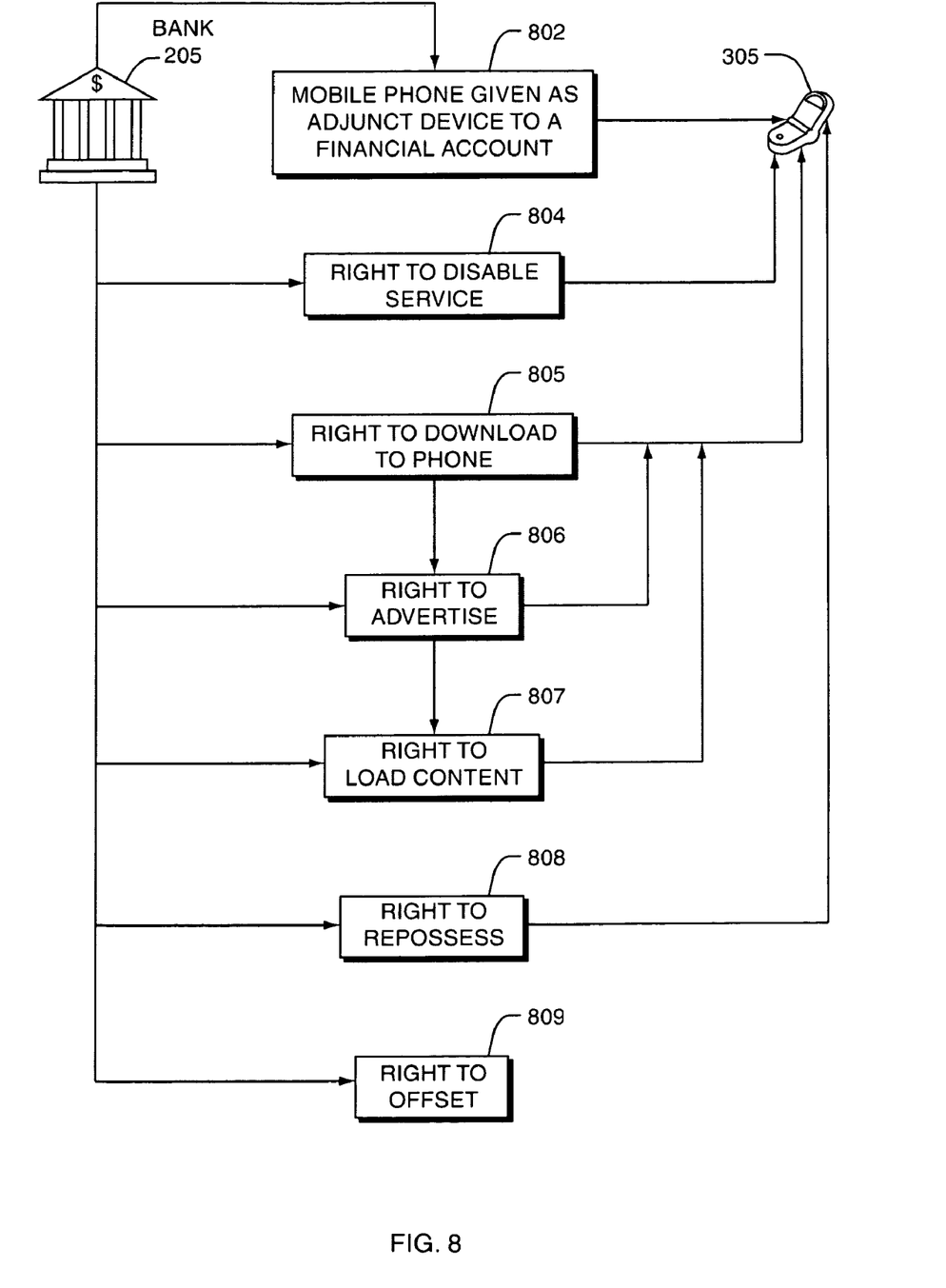
FIG. 8 presents a block diagram of a preferred embodiment of the present invention where the financial services provider may manipulate the adjunct wireless device, including disabling said device or importing or otherwise downloading software or applications or other content or multi-media content to the adjunct wireless device.

FIG. 8 depicts an exemplary method of downloading software, advertising, or other content to the wireless access device 305 and/or disabling service for the wireless access device 305. The financial institution or bank 205 procures the wireless adjunct devices 305, such as wireless mobile radio telephone handsets or other suitable adjunct devices and at step 802 provides them to account holders for use as an adjunct access device in much the same manner as customary account equipments, such as debit cards. The bank, as provider of the MDN and MEID of the device 305, maintains the right to disable the adjunct wireless device, e.g., for security or other reasons, via a disabler module of the owner's rights 106 (see FIG. 1). For example, the bank may choose to disable the wireless adjunct device under certain conditions, such as when a predetermined number of attempts to authenticate the user's identity have fail, or in cases of apparent fraud or abuse.

As deemed necessary for quality of service requirements, features, or cost offset, the bank now has a single platform for service enhancement and retains the right to import or download software or software updates to the phone 305 (step 805) from time to time, as a financial institution may deem necessary, e.g., to facilitate financial transactions or other types of transactions, to advertise upon the device 305 (step 806), the right to load content such as multi-media content to device 305 (step 807), the right to ask for return of the device 305 (step 808), and the right to offset, within the account holder's financial account, for loss, theft and abuse (step 809).

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Each reference cited herein is incorporated herein by reference in its entirety.

Having thus described the preferred embodiments, the invention is now claimed to be:

1. A system for executing transactions in connection with a user-account-based service by a user having a user account, said system comprising:
   a wireless adjunct device for receiving and transmitting information relating to the service via a wireless communication network, said wireless adjunct device having a unique identification number of a type which enables said wireless adjunct device to access the wireless communication network, said wireless adjunct device further having a first input device for inputting alpha, numeric, or alphanumeric data for transmission over the wireless communication network when the user attempts to execute a transaction and a second input device for inputting user biometric data for transmission over the wireless communication network when the user attempts to execute a transaction;
   a first level authentication database having stored therein said unique identification number, said unique identification number being associated with the user account;
   a first level authentication processor for verifying that the unique identification number transmitted by said wireless adjunct device matches said unique identification number stored in said first level authentication database and associated with the user account;
   a second level authentication database having stored therein an alpha, numeric, or alphanumeric password, said alpha, numeric, or alphanumeric password being associated with the user account;
   a second level authentication processor for verifying that alpha, numeric, or alphanumeric data input by the user and transmitted by the wireless adjunct device matches said alpha, numeric, or alphanumeric password stored in said second level authentication database and associated with the user account;
   a third level authentication database having stored therein a biometric data unit, said biometric data unit being associated with the user account;
   a third level authentication processor for verifying that the user biometric data transmitted by the wireless adjunct device matches said biometric data unit stored in said third level authentication database and associated with the user account.

2. The system of claim 1, wherein said wireless adjunct device is a cellular telephone and the wireless communication network is selected from one or both of a cellular telephony network and a text messaging network.

3. The system of claim 1, wherein said unique identification number is selected from one or both of an MDN and an MEID.

4. The system of claim 3, wherein at least a portion of said account number includes one or both of the MDN and MEID.

5. The system of claim 1, wherein said first input device is an alpha, numeric, or alphanumeric keypad and said second input device is a microphone.

6. The system of claim 1, further comprising:
   an ownership rights module including one or more of: a software download module for downloading software to said wireless adjunct device; an advertising download module for downloading advertising content to said wireless adjunct device; and a disabler module for selectively disabling the wireless adjunct device.

7. The system of claim 1, wherein the user-account-based service is selected from the group consisting of a financial service and a banking service.

8. A method for facilitating wireless transactions executed in connection with a user-account-based service offered by a service provider, said method comprising:
   registering by a user by accepting registration information from a user and creating a creating a user account;
   assigning a unique identification number to a wireless adjunct device, said unique identification number being of a type which enables the wireless adjunct device to access a wireless communication network;
   providing the wireless adjunct device to the user for executing transactions via the wireless communication network;
   storing said unique identification number in a first level authentication database and associating the unique identification number with the user account;
   storing an alpha, numeric, or alphanumeric password in a second level authentication database and associating the alpha, numeric, or alphanumeric password with the user account; and
   capturing a user biometric data unit and storing said user biometric data unit in a third level authentication database.

9. The method of claim 8, further comprising:
   establishing communications between said wireless adjunct device and said service provider;
   receiving transmission of a transmitted identification number from the wireless adjunct device;
   determining whether a match exists between the transmitted identification number and said unique identification number stored in said first level authentication database; and
   if a match exists between the transmitted identification number and said unique identification number stored in said first level authentication database, accepting transmission of at least one of an input alpha, numeric, or alphanumeric password and an input biometric data unit.

10. The method of claim 9, further comprising:
    receiving transmission of an input alpha, numeric, or alphanumeric password;
    comparing the input alpha, numeric, or alphanumeric password to said stored alpha, numeric, or alphanumeric password; and
    granting access to said user account if a match exists between the input alpha, numeric, or alphanumeric password and said stored alpha, numeric, or alphanumeric password.

11. The method of claim 9, further comprising:
    receiving transmission of an input biometric data unit;

comparing the input biometric data unit to said stored user biometric data unit; and granting access to said user account if a match exists between the input biometric data unit and said stored user biometric data unit.

12. The method of claim 8, wherein said wireless adjunct device is a cellular telephone and the wireless communication network is selected from one or both of a cellular telephony network and a text messaging network.

13. The method of claim 8, wherein said unique identification number is selected from one or both of an MDN and an MEID.

14. The method of claim 13, wherein at least a portion of said account number includes one or both of the MDN and MEID.

15. The method of claim 8, wherein said input alpha, numeric, or alphanumeric password is input via an alpha, numeric, or alphanumeric keypad or said adjunct device and said input biometric data unit is voice print data input via a microphone of said adjunct device.

16. The method of claim 8, further comprising:

establishing communications between said wireless adjunct device and said service provider;

for each transaction sought to be executed, receiving transmission of an identification number from the wireless adjunct device and determining whether a match exists between the transmitted identification number and said unique identification number stored in said first level authentication database;

if a match exists between the transmitted identification number and said unique identification number stored in said first level authentication database, accepting transmission of an input alpha, numeric, or alphanumeric password;

comparing said input alpha, numeric, or alphanumeric password to said stored alpha, numeric, or alphanumeric password;

if a match exists between the input alpha, numeric, or alphanumeric password and said stored alpha, numeric, or alphanumeric password determining whether the transaction sought to be executed meets a preselected criterion;

if the transaction does not meet said preselected criterion, granting access to said user account; and if the transaction meets said preselected criterion, accepting transmission of an input biometric data unit:

comparing said input biometric data unit to said stored user biometric data unit; and granting access to said user account if a match exists between said input biometric data unit and said stored user biometric data unit.

17. The method of claim 16, further comprising:

said user account is selected from the group consisting of a financial account and a bank account and said preselected criterion is a dollar amount.

18. The method of claim 8, wherein the user account is selected from the group consisting of a financial account and a bank account and said method further comprising:

conducting settlement for financial transactions on said user account; and settling charges associated with the user's usage of the wireless adjunct device into said account.

19. The method of claim 8, further comprising:

downloading one or both of software applications and advertising to said wireless adjunct device.

20. The method of claim 8, further comprising:

disabling said wireless adjunct device when certain conditions are met.

* * * * *